United States Patent [19]

Andrea et al.

[11] Patent Number: 4,679,069

[45] Date of Patent: Jul. 7, 1987

[54] COLOR PICTURE PROJECTION SYSTEM WITH A WAVELENGTH-SELECTIVE REFLECTOR FOR FILTERING OUT UNDESIRED LIGHT FROM A MONOCHROME PICTURE DISPLAY SOURCE

[75] Inventors: Johan Andrea, Eindhoven, Netherlands; Eugene Lubchenko, Knoxville; Ralph H. Bradley, Kingsport, both of Tenn.

[73] Assignees: NAP Consumer Electronics Corp.; U.S. Philips Corporation, both of New York, N.Y.

[21] Appl. No.: 630,629

[22] Filed: Jul. 13, 1984

[51] Int. Cl.$^4$ .......................... H04N 9/31; H04N 9/16; G03B 21/26; G03B 21/28

[52] U.S. Cl. ........................................ 358/60; 358/64; 353/30; 353/37

[58] Field of Search .................. 358/60, 61, 62, 63, 358/231, 232, 233, 234, 235, 236, 237, 238, 239, 64; 352/57, 59, 60, 66, 67; 353/7, 30, 33, 34, 37

[56] References Cited

U.S. PATENT DOCUMENTS

| 2,697,743 | 12/1954 | Schroeder | 358/64 |
|---|---|---|---|
| 2,803,698 | 8/1957 | de Vrijer | 358/64 |
| 2,953,635 | 9/1960 | de Gier | 358/64 |
| 4,051,513 | 9/1977 | Takeuchi et al. | 358/60 |
| 4,300,156 | 11/1981 | Boyd | 358/64 |
| 4,400,723 | 8/1983 | Fanizza et al. | 358/60 |
| 4,454,535 | 6/1984 | Machida | 358/60 |
| 4,578,710 | 3/1986 | Hasegawa | 358/60 |

FOREIGN PATENT DOCUMENTS

| 5488 | 1/1982 | Japan | 358/60 |
|---|---|---|---|
| 94286 | 6/1983 | Japan | 358/60 |
| 134593 | 8/1983 | Japan | 358/60 |
| 222689 | 12/1983 | Japan | 358/60 |
| 10086 | 1/1984 | Japan | 358/60 |

*Primary Examiner*—James J. Groody
*Assistant Examiner*—Randall S. Svihla
*Attorney, Agent, or Firm*—Thomas A. Briody; William J. Streeter; Marianne R. Rich

[57] ABSTRACT

In a color picture projection system three monochrome pictures are superimposed to form a color display on a projection screen by means of a chromatic projection lens system in each of three channels. Each channel has a reflector to fold the light path. Since at least one monochrome picture (e.g. the blue picture) includes radiation within a desired band of wavelengths corresponding to its associated color and radiation outside of this desired band, the reflector in this channel is wavelength-selective and reflects only the radiation within the desired band towards the projection screen. The undesired radiation is transmitted through the reflector so that it does not reach the projection screen. Achromatic lenses are therefore not required.

11 Claims, 9 Drawing Figures

COLOR PICTURE PROJECTION SYSTEM WITH A WAVELENGTH-SELECTIVE REFLECTOR FOR FILTERING OUT UNDESIRED LIGHT FROM A MONOCHROME PICTURE DISPLAY SOURCE

BACKGROUND OF THE INVENTION

1. Field of the Invention

The invention relates to a color-picture projection system provided with a plurality of optical channels which each comprise a monochrome picture display tube, and a projection lens system for projecting the picture of the display tube onto a screen which is common to all the channels and on which the individual pictures are superimposed to form one color picture, a plurality of reflectors being arranged between the projection lens system and the projection screen for folding the radiation path. The invention also relates to a projection lens system intended for use in such a color-picture projection system.

2. Description of the Prior Art

Such a color-picture projection system is disclosed in, for example, U.S. Pat. No. 4,400,723. The system described therein comprises three cathode-ray tubes which are arranged in line and which produce a blue, a red and a green picture respectively. Magnified images of each of these pictures are formed on a common projection screen by means of separate projection lens systems. Between the projection lens systems and the projection screen there are arranged, in this order, a first mirror which reflects the beams emerging from the projection lens systems in an upward direction and a second mirror which reflects this reflected beam towards the projection screen in a substantially horizontal direction. By means of these mirrors the radiation path between the projection lens systems and the projection screen is "folded", i.e. accommodated within a smaller volume without thereby reducing the length of this radiation path, which length must be substantial in view of the required magnification.

The elements of projection lens systems employed in current color-picture projection systems are preferably made of a transparent plastic. These projection lens systems have a substantially lower weight and smaller dimensions than projection lens systems employing glass elements. Projection lens systems comprising plastic elements, however, are only capable of forming a sharp image by means of a substantially monochromatic beam, or in other words, these projection systems exhibit chromatic aberration. Projection lens systems comprising glass elements can be rendered achromatic to minimize chromatic aberration, but this requires additional steps such as the use of different types of glass for the various lens elements.

The phosphors which are suitable for use as light-emitting layers in cathode-ray tubes because of their high luminous efficiency have a given spectral width, which means that upon excitation by an electron beam they not only emit pure red, green or blue light, i.e. light of one specific wavelength, but also light components of wavelengths in a range around the desired wavelength. The last-mentioned components cannot be imaged sharply on the projection screen by the relevant chromatic projection lens system. On the three sharp images in the colors red, green and glue projected on this screen spurious unsharp pictures of different colors are superimposed. As a result of this the sharpness of the color picture formed on te projection screen will not be optimal.

The spurious images on the projection screen may be reduced by arranging a transmission filter which only transmits the desired wavelength and which absorbs other wavelengths in the optical channels between the projection lens systems and the projection screen. However, such filters only permit a reduction of the spurious images and not an effective elimination because the transmission-versus-wavelength characteristic of such a filter is not sufficiently steep. Moreover, the use of such a filter in an optical channel means the introduction of an additional element and of two additional surfaces which may produce reflection.

SUMMARY OF THE INVENTION

It is the object of the present invention to provide a color-picture projection system which almost completely eliminates the spurious images without the use of additional elements in the radiation path. According to the invention the systems is characterized in that at least one of the reflectors in at least one of the optical channels is a wavelength-selective reflector which reflects only the wavelength to be transmitted by the relevant channel.

The color-picture projection system used most frequently in practice, for example for color TV projection, comprises three cathode-ray tubes, which produce a red, a green and a blue picture respectively. It has been found that spurious images are formed in particular in the blue channel because the phosphor used for the formation of the blue picture has a substantial spectral width and because the materials used in the projection lens systems and the plastics used in the projection screen exhibit a substantial dispersion in particular in the blue-violet region of the light spectrum. A preferred embodiment of the invention is therefore characterized in that a reflector in the channel for the blue picture is a wavelength-selective reflector which almost exclusively reflects blue light.

Preferably, the wavelength-selective reflector is a dichroic mirror. Dichroic mirrors have steep reflection-versus-wavelength characteristics and are therefore very suitable for use as color filters in color-picture projection systems.

It is to be noted that the use of dichroic mirrors in a color television projection system is known per se, for example from U.S. Pat. No. 4,300,156. In the system described therein the dichroic mirrors are arranged directly behind the display tubes and serve to combine the three monochrome pictures to one color picture which is projected onto the screen by a single non-achromatic projection lens. The known system does not comprise three optical channels each having a separate projection lens and the dichroic mirrors are not used for filtering the light in separate channels. In the system disclosed in U.S. Pat. No. 4,300,156 the problem that the different color pictures cannot be imaged sharply on the projection screen by means of a chromatic lens is solved by changing the positions of the display tubes and by adapting the magnitudes of the deflection signals applied to these tubes.

A projection lens system for use in a color-picture projection system comprising a plurality of lens groups is characterized in that a wavelength-selective reflector is arranged between two lens groups, which reflector reflects only radiation of the wavelength to be transmitted by the optical channel for which the projection lens system is intended.

BRIEF DESCRIPTION OF THE DRAWING

Embodiments of the invention will now be described in more detail, by way of example, with reference to the accompanying drawings. In the drawings.

Figure 1:
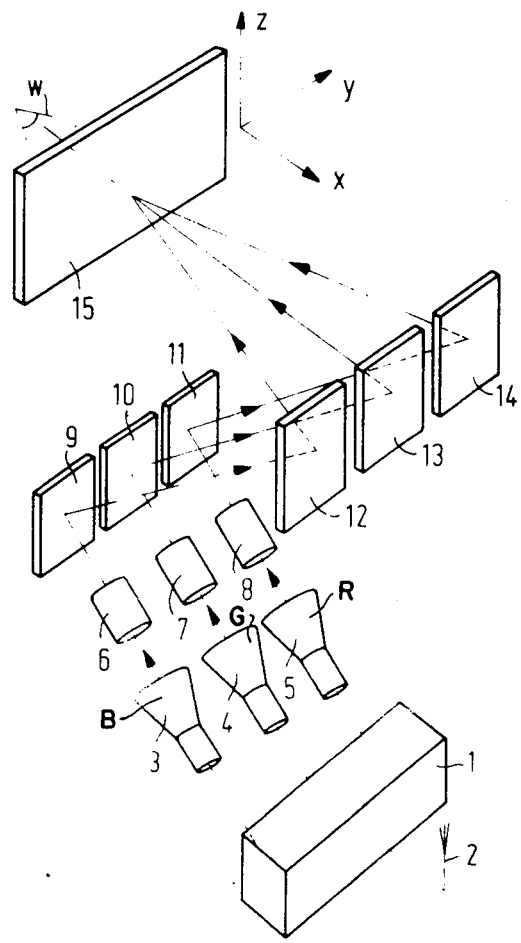
FIG. 1 shows a color-television projection system in accordance with the invention.

The color television projection system which is shown schematically and in perspective in FIG. 1 comprises a color television receiver 1. An input of this receiver, which is connected to for example an antenna 2, receives a color television signal which is divided into a red, a green and a blue signal. These signals are applied to three picture display tubes, in the present instance three cathode-ray tubes 3, 4, and 5, which produce a blue, green and red picture on their respective fluorescent screens. These pictures are projected onto a projection screen 15 by the associated projection lens systems 6, 7 and 8. For the sake of clarity only the chief rays of the beams which issue from the cathode-ray tubes are shown. First mirrors 9, 10 and 11 which reflect the emergent beams from the cathode-ray tubes obliquely upwards and second mirrors 12, 13, and 14 which reflect these reflected beams towards the projection screen are arranged between the projection lens system and the projection screen. These mirrors "fold" the radiation path, enabling the projection system to be accommodated in a cabinet of comparatively small depth without reducing the length of this radiation path.

The three monochrome pictures must be superimposed. For this purpose the three dispaly tubes which are arranged in line are slightly inclined towards one another, which means that the normals to the screens of the tubes 3 and 5 make a small angle with the normal to the screen of the tube 4.

In the projection screen 15 the light of the three beams is scattered through a comparatively large angle in the y-direction, i.e. the horizontal direction for the viewer w, and the light is scattered through a smaller angle in the z-direction, i.e. the vertical direction for the viewer. The viewer w perceives a picture which is a superposition of the magnified pictures produced by the cathode-ray tubes 3, 4 and 5.

Preferably, the elements of the projection lens systems 6, 7 and 8 are made of a transparent plastic, so that the projection lens systems are chromatic, which means that they only form a sharp image on the projection screen for pictures which are purely blue, red and green, respectively. Pictures of different colors are not imaged sharply on the projection screen by these lens systems.

Figure 2A:
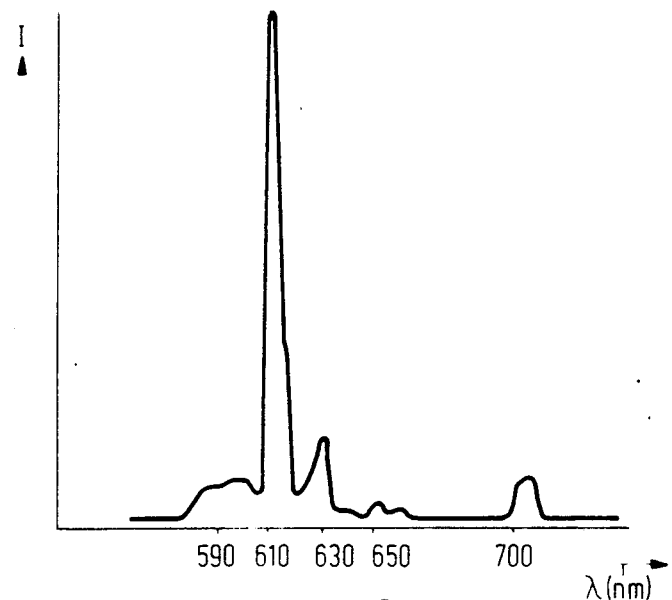
FIGS. 2a, 2b, 2c shows examples of the spectra of the phosphors to be used in the display tubes of the projection system.
Figure 2B:
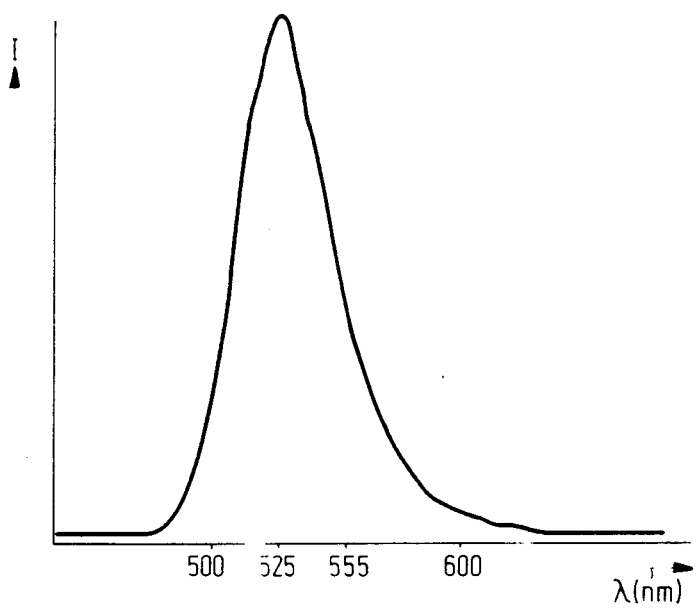
Figure 2C:
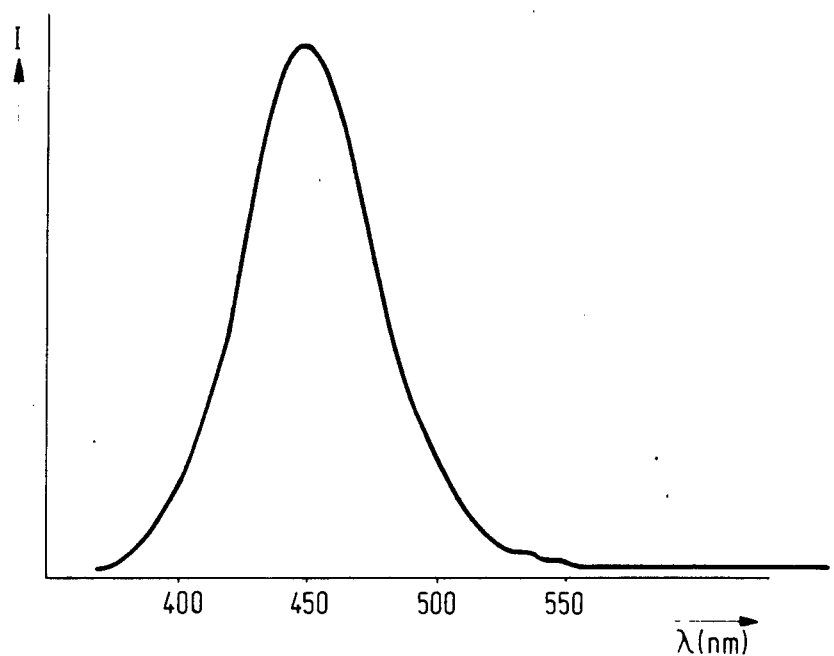

By way of example FIGS. 2a, 2b, and 2c represent the spectra of a red phosphor of the composition $Y_2O_3$:Eu (europium-activated yttrium trioxide); a green phosphor of the composition $ZnSiO_4$: Mn (manganese-activated zinc silicate); and a blue phosphor of the composition ZnS:Ag (silver-activated zinc sulfide) respectively. It can be seen that in particular the blue phosphor has a broad spectrum. Only a part of the radiation emerging from the display tube 3 which is provided with such a phosphor can be imaged sharply on the projection screen by the projection lens system. Moreover, the plastic used for the projection lenses and the material used for the projection screen, for example PMMA (polymethylmethacrylate) exhibit a dispersion in the blue-violet region of the light spectrum which is substantially higher, for example three times, than in the other regions of this spectrum.

If no special steps are taken this will give rise to spurious pictures, in particular non-blue pictures in the blue channel, which spurious pictures are not imaged sharply on the projection screen. This will give rise to a reduced sharpness of the composite picture perceived by the viewer.

In order to preclude this, in accordance with the invention, one of the reflectors preferably in the blue channel, for example the reflector 9, is a dichroic mirror. This reflector reflects only blue light and transmits the remainder of the light emitted by the cathode-ray tubes. The transmitted light may be absorbed by means of an absorbing layer, for example a black paint, applied to the back of the mirror 9.

Figure 3:
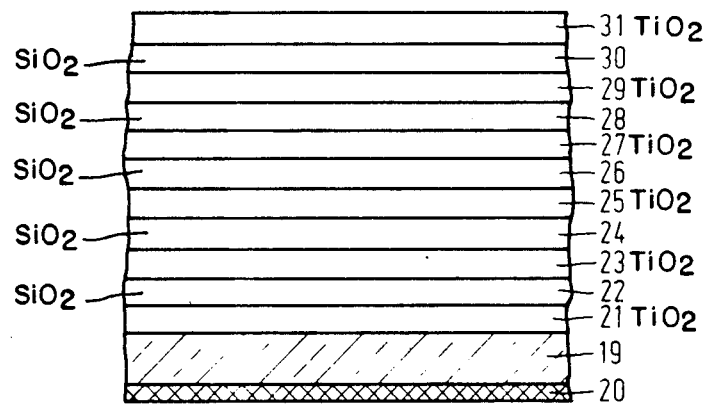
FIG. 3 shows an example of a dichroic mirror for the blue channel.

FIG. 3 shows an example of a dichroic mirror for the blue channel. This mirror comprises a glass substrate 19 on which eleven layers 21–31 are deposited. The layers 21, 23, 25, 27, 29 and 31 are made of titanium oxide ($TiO_2$) and the layers 22, 24, 26, 28 and 30 are made of silicon dioxide ($SiO_2$). All the layers 21-31 have a thickness of substantially a quarter of the reference wavelength $\lambda_0$, which in the present case is approximately 500 nm. The back of the substrate 19 may be coated with a layer 20 of a matte black paint which absorbs the undesired radiation.

Figure 4:
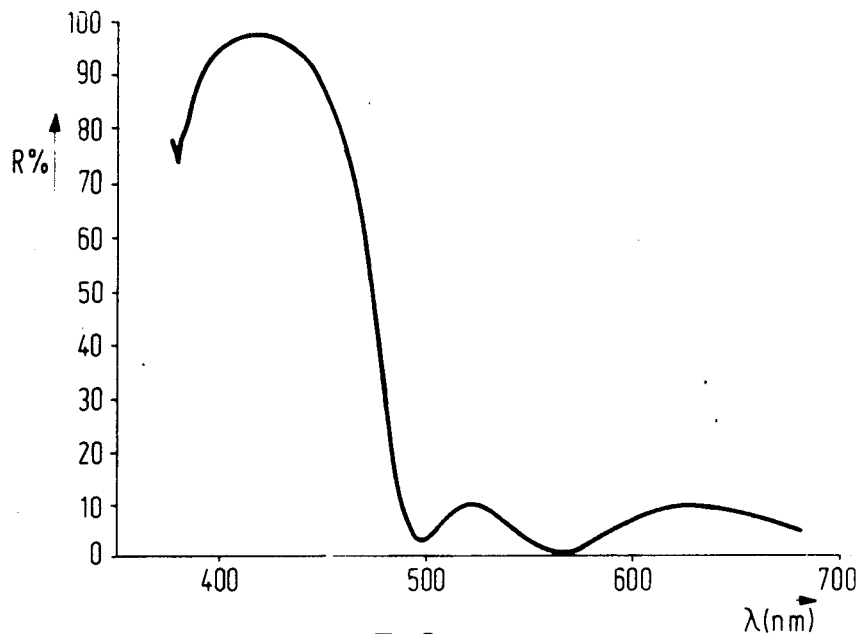
FIG. 4 represents the reflection coefficient as a function of the wavelength for said mirror.

FIG. 4 represents the reflection coefficient R as a function of the wavelength $\lambda$ for the dichroic mirror shown in FIG. 3. It is clearly visible that the reflection coefficient for the blue region of the spectrum is high and decreases rapidly for wavelengths in the 500-nm band.

As is apparent from FIG. 2b, the phosphor used in the green display tube also has a comparatively broad spectrum. This means that in the green channel also undesired unsharp pictures may be formed. However, these are less annoying than those in the blue channel because the spectral width of the green phosphor is smaller than that of the blue phosphor and because the dispersion of the materials in the projection lens system and that of the projection screen material for the green region of the light spectrum are substantially smaller than for the blue region of the spectrum. The occurrence of the spurious images in the green channel can be precluded by constructing the first reflector in the green channel, i.e. reflector 10 in FIG. 1, as a dichroic mirror.

Figure 5:
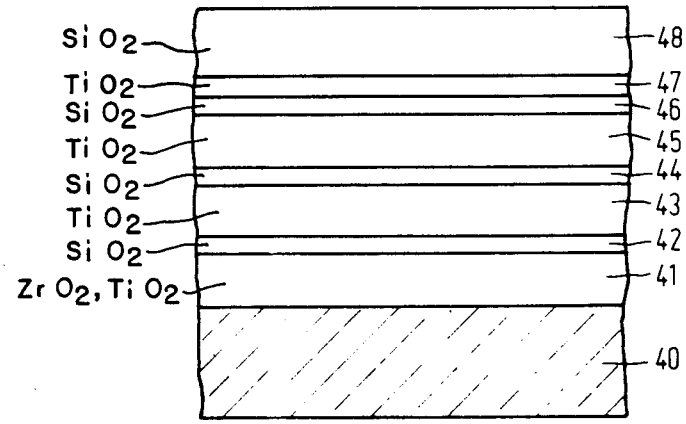
FIG. 5 shows an example of a dichroic mirror for the green channel.

FIG. 5 shows an example of a dichroic mirror for the green channel. This mirror comprises a glass substrate 40 on which eight thin layers 41–48 are deposited. The layers 42, 44, 46 and 48 are made of silicon dioxide ($SiO_2$), the thickness of the layers 42, 44 and 46 being approximately $\frac{1}{4}\lambda$ and the thickness of the layer 48 being approximately $\lambda_0$. The layers 43, 45 and 47 are made of titanium oxide (TiO$_2$), the layers 43 and 45 having a thickness of approximately $\frac{3}{4}\lambda_0$ and the layer 47 having a thickness of $\frac{1}{4}\lambda_0$. The layer 41 having a thickness of approximately $\frac{3}{4}\lambda_0$ is made of an alloy of zirconium oxide (ZrO$_2$) and titanium oxide (TiO$_2$) known by the trade name of HBN (Merck). The back of the substrate 40 may again by covered with an absorbing layer, not shown. Here $\lambda_0$ is 525 nm.

Figure 6:
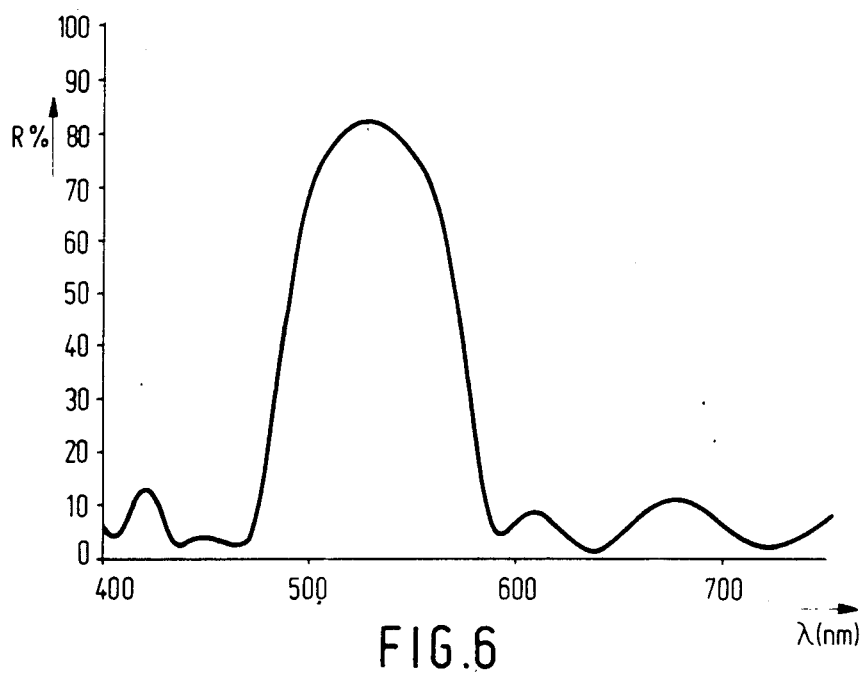
FIG. 6 represents the reflection coefficient as a function of the wavelength for the last-mentioned mirror.

FIG. 6 represents the reflection coefficient R as a function of the wavelength $\lambda$ for the dichroic mirror shown in FIG. 5. The curve comprises two steep flanks both towards the blue region of the spectrum and towards the red region of the spectrum, so that this mirror is reflecting only for the green portion of the spectrum.

In principle, an arbitrary reflector in a color channel may be replaced by a dichroic mirror. However, it is advantageous to replace the smallest reflector in the relevant channel, that is the mirror nearest the projection lens system in the picture-magnifying system under consideration.

Figure 7:
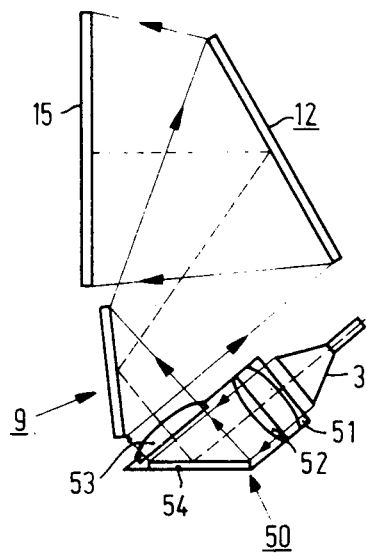
FIG. 7 shows a projection system comprising a projection lens system in accordance with the invention.

The volume of the projection system can be reduced if use is made of a special projection lens system as shown schematically in FIG. 7. This fugure shows the color-picture projection system in cross-sectional view, so that only one channel is visible. As already stated, a projection lens system comprises a plurality of, for example three, lens groups each comprising one or more elements. One of these lens groups determines the power of the entire lens system, whereas the two other groups correct the aberrations of the first group. It is known to arrange a reflector between these lens groups, so that the beam which emerges from the projection lens system already has such a direction that the other reflectors of the color picture projection system may be arranged at such angles and at such distances that the projection lens system becomes more compact. In FIG. 7 such a projection lens system bears the reference numeral 50. The lens group mentioned above each comprise one lens and are referenced 51, 52 and 53, respectively, while the reflector in the lens system bears reference numeral 54. As discussed with reference to FIG. 1, reflector 9 may be constructed as a dichroic mirror. However, alternatively reflector 54 may be a dichroic mirror. The dichroic mirror is then situated in an enclosed space so that it cannot be damaged.

The invention has been described for a color television projection system comprising three display tubes in the form of cathode-ray tubes. The projection system is also suitable for the projection of images other than television pictures, such as digital data. Moreover, the projection system may comprise more than three color channels. Generally speaking the invention may be used in those cases in which a color picture is to be formed by means of three or more display tubes of which at least one tube produces a picture which is not monochrome to a satisfactory extent.

What is claimed is:

1. A color picture projection system comprising:
   means for displaying a color picture consitituted by a first, a second and a third monochrome picture superimposed upon one another;
   first, second and third monochrome picture display means for generating, respectively, a first, a second and a third monochrome picture comprising, respectively, a first, a second and a third band of desired wavelengths;
   a first, a second and a third projection lens system arranged between said color picture displaying means and, respectively, said first, second and third monochrome picture display means, for projecting, respectively, said first, second and third monochrome pictures along, respectively, a first, a second and a third light path towards said color picture displaying means; and
   first and second optical means arranged between said color picture displaying means and said first and second monochrome picture display means, respectively, for, respectively, folding said first light path and said second light path, said first optical means comprising wavelength-selective reflector means external to said second and third light paths for reflecting only wavelengths within said first band of desired wavelengths towards said color picture displaying means.

2. A color picture projection system as claimed in claim 1, wherein said wavelength-selective reflector means is a dichroic mirror.

3. A color picture projection system as claimed in claim 2, wherein said dichroic mirror has a front surface for reflecting light and a back surface; further comprising a light absorbing layer on said back surface.

4. A color picture projection system as claimed in claim 1, wherein said wavelength-selective reflector means comprises a dichroic mirror having a glass substrate and a plurality of layers deposited on said glass substrate, said plurality of layers comprising layers made of TiO$_2$ and layers made of SiO$_2$.

5. A color picture projection system as claimed in claim 1, wherein said first, second and third monochrome pictures are, respectively, a blue, a green and a red picture.

6. A color picture projection system as claimed in claim 1, wherein said first, second and third monochrome pictures are, respectively, a green, a blue and a red picture.

7. A color picture projection system as claimed in claim 1, wherein said second optical means comprises wavelength-selective reflector means external to said first and third light paths for reflecting only wavelengths within said second band of desired wavelengths towards said color picture displaying means.

8. A color picture projection system as claimed in claim 7, wherein said first, second and third monochrome pictures are, respectively, a blue, a green and a red picture.

9. A color picture projection system as claimed in claim 1, wherein said first projection lens system comprises a first and a second lens group;
   and wherein said wavelength-selective reflector means is arranged between said first and second lens groups for reflecting only said wavelengths within said first band of desired wavelengths from said first to said second lens group.

10. A color picture projection system having a red optical channel, a green optical channel, and a blue optical channel, a projection screen common to all of said channels, said red, green and blue channels comprising, respectively, red, green and blue monochrome picture display means generating, respectively, a red picture, a green picture and a blue picture, each of said channels further comprising a projection lens system for projecting respective ones of said red, green and blue pictures onto said projection screen, superimposition of said red, green and blue pictures on said projection screen constituting said color picture, said red, green and blue optical channels each further comprising a reflector arranged between the respective projection lens system and said projection screen for folding the respective optical channel,
    and wherein said reflector in said blue channel is a wavelength-selective reflector reflecting only wavelengths to be transmitted in said blue channel.

11. A color picture projection system having a red optical channel, a green optical channel and a blue optical channel, a projection screen common to all of said channels, said red, green and blue channels comprising, respectively, red, green and blue monochrome picture display means generating, respectively, a red picture, a green picture and a blue picture, each of said channels further comprising a projection lens system for projecting respective ones of said red, green and blue pictures onto said projection screen, superimpositon of said red, green and blue pictures on said projection screen constituting said color picture, said red, green and blue optical channels each further comprising a reflector arranged between the respective projection lens system and said projection screen for folding the respective optical channel,
    and wherein said reflector in said green channel is a wavelength-selective reflector reflecting only wavelengths to be transmitted in said green channel.

\* \* \* \* \*